United States Patent [19]
McKee et al.

[11] Patent Number: 6,111,024
[45] Date of Patent: Aug. 29, 2000

[54] PROCESS FOR PRODUCING MOULDING COMPOUNDS MODIFIED WITH ACRYLIC RUBBER AND MOULDING COMPOUNDS THUS OBTAINABLE

[75] Inventors: Graham Edmund McKee; Bernhard Rosenau, both of Neustadt, Germany

[73] Assignee: BASF Aktiengesellschaft, Ludwigshafen, Germany

[21] Appl. No.: 09/155,907

[22] PCT Filed: Apr. 14, 1997

[86] PCT No.: PCT/EP97/01869

§ 371 Date: Oct. 8, 1998

§ 102(e) Date: Oct. 8, 1998

[87] PCT Pub. No.: WO97/39038

PCT Pub. Date: Oct. 23, 1997

[30] Foreign Application Priority Data

Apr. 15, 1996 [DE] Germany .......................... 196 14 845

[51] Int. Cl.[7] .............................. C08L 51/00; C08L 37/00
[52] U.S. Cl. .............................. 525/242; 525/71; 525/78; 525/74; 525/243
[58] Field of Search .................. 525/78, 71, 84, 525/243, 242

[56] References Cited

U.S. PATENT DOCUMENTS

| | | | |
|---|---|---|---|
| 3,691,260 | 9/1972 | Mittnacht et al. | 260/876 |
| 4,224,419 | 9/1980 | Swoboda et al. | 525/71 |
| 4,426,499 | 1/1984 | Korte et al. | 525/316 |
| 4,433,102 | 2/1984 | Brandstetter et al. | 525/75 |
| 4,442,263 | 4/1984 | Brandstetter et al. | 525/83 |
| 4,634,734 | 1/1987 | Hambrecht et al. | 525/85 |
| 4,788,253 | 11/1988 | Hambrecht et al. | 525/83 |
| 4,870,131 | 9/1989 | Pisipati et al. | 525/74 |
| 5,008,330 | 4/1991 | Laughner | 525/67 |
| 5,026,777 | 6/1991 | Jalbert et al. | 525/67 |
| 5,155,172 | 10/1992 | Siol et al. | 525/308 |
| 5,223,573 | 6/1993 | Kuruganti et al. | 525/67 |
| 5,270,386 | 12/1993 | Laughner | 525/66 |
| 5,286,790 | 2/1994 | Laughner | 525/67 |
| 5,354,796 | 10/1994 | Creecy et al. | 525/464 |
| 5,539,030 | 7/1996 | Laughner | 525/66 |
| 5,543,448 | 8/1996 | Laughner | 525/66 |
| 5,580,924 | 12/1996 | Wildi et al. | 525/41 |

FOREIGN PATENT DOCUMENTS

| | | |
|---|---|---|
| 057845 | 8/1982 | European Pat. Off. . |
| 308146 | 3/1989 | European Pat. Off. . |
| 381065 | 8/1990 | European Pat. Off. . |
| 1182811 | 12/1964 | Germany . |
| 3149046 | 12/1981 | Germany . |
| 3206136 | 2/1982 | Germany . |
| 3227555 | 2/1984 | Germany . |
| 4248839 | 1/1991 | Japan . |

*Primary Examiner*—P. Hampton-Hightower
*Attorney, Agent, or Firm*—Keil & Weinkauf

[57] ABSTRACT

Rubber-modified molding materials having improved impact strength in combination with good flow behavior can be prepared by special graft polymerization of monomers forming hard graft shells, such as styrene and acrylonitrile, in the presence of an elastomeric acrylate macromonomer copolymer dissolved or swollen in these monomers, the graft polymerization being carried out, to a conversion of more than 15% by weight of the monomers, by thermal or free radical mass or solution polymerization.

11 Claims, No Drawings

PROCESS FOR PRODUCING MOULDING COMPOUNDS MODIFIED WITH ACRYLIC RUBBER AND MOULDING COMPOUNDS THUS OBTAINABLE

BACKGROUND OF THE INVENTION

1. Field of the Invention

The present invention relates to a process for the preparation of a molding material modified with acrylic rubber, by graft polymerization of monomers forming the graft shell, in the presence of an acrylic rubber which is swollen or dissolved in the monomers and contains macromonomers as comonomers.

2. Description of the Related Art

The preparation of rubber-modified molding materials has long been known. The use of elastomeric acrylate polymers having glass transition temperatures of less than 0° C. and preferably less than −10° C. (acrylic rubber), for molding materials modified in this manner has also been known for almost 40 years. Compared with the molding materials prepared with diene rubbers, they have improved weathering resistance. In the modified multiphase molding materials, domains of the rubber are embedded in a matrix of a thermoplastic, the domain structure playing a major role in determining the mechanical properties of the resulting molding materials. The toughness of the molding materials results from increased energy absorption during deformation up to fracture, energy being consumed for the formation of microcavities or for inducing sliding processes of the matrix polymer chains. The multiphase character is therefore an essential precondition for achieving high impact strengths.

There is still a great need for molding materials modified with acrylic rubber and in particular for styrene/acrylonitrile copolymers modified with acrylic rubber (ASA molding materials), which have good weathering resistance, high impact strength and good flow properties.

The preparation of ASA molding materials in emulsion is described in many publications in the patent literature (cf. for example DE-A 19 11 882, DE-A 28 26 925, DE-A 31 29 378, DE-A 31 29 472, DE-A 31 49 046, DE-A 31 49 358, DE-A 32 06 136, DE-A 32 27 555).

The disadvantage of this preparation in emulsion is the requirement for the removal of assistants during the working up of the molding materials, in order to avoid subsequent problems during their processing (discoloration, speck formation, corrosion). In particular, however, the impact strength, tensile strength and gloss properties of the surfaces of shaped articles produced therefrom are unsatisfactory.

DE-B 11 82 811, published more than 30 years ago, discloses the polymerization of an acrylate together with a crosslinking monomer in solution for the preparation of a rubber-modified molding material, the monomers styrene and acrylonitrile to be grafted on being added after a conversion of only from 20 to 40% by weight of the monomers and then being polymerized by mass or solution polymerization. The varying composition in the graft reaction and incorporation of rubber units into the graft shell by polymerization result in a reduction of the Vicat softening temperature and a deterioration in other mechanical properties of the resulting molding material.

It is an object of the present invention to prepare molding materials which are modified with acrylic rubber and can be processed to give shaped articles having improved impact strength and good flow properties and reduced surface gloss.

BRIEF SUMMARY OF THE INVENTION

We have found that this object is achieved if an acrylic rubber modified by copolymerization with a macromonomer is prepared, said rubber is dissolved or swollen in the monomers forming the graft shell and in some cases the polymer matrix, and this mixture is polymerized in one or more stages, at least the first stage of the graft polymerization being carried out, to a conversion of more than 15, preferably from 20 to 40, % by weight of the monomers, by thermal or free radical mass polymerization or by solution polymerization.

DETAILED DESCRIPTION OF THE INVENTION

The present invention thus relates to a process for the preparation of a molding material (A) modified with acrylic rubber (A2) by (a) copolymerization of a mixture (A2M) of p2 (a1) at least one monomer (A2m1) of the formula

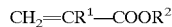

where $R^1$ is hydrogen or methyl and $R^2$ is alkyl of 1 to 32 carbon atoms, (a2) at least one macromonomer (A2m2) which has a terminal copolymerizable C=C double bond and an average molecular weight $M_w$ of from about 1500 to 40000, contains units of at least one of the monomers (A1m) as polymerized units and is wholly or partly compatible with the polymers or copolymers of the monomers (A1m), and (a3) if required, at least one further copolymerizable olefinically unsaturated monomer (A2m3) in an amount of less than 50% by weight of the amount of alkyl acrylate or methacrylate (A2m1), to give an acrylic rubber (A2) having a glass transition temperature of less than 0° C., (b) dissolution or swelling of the acrylic rubber (A2), with or without the addition of a solvent, in one or more olefinically unsaturated monomers (A1m) which form the hard graft shell and whose polymers or copolymers have a glass transition temperature of at least +20° C. to give a mixture (AM) and (c) graft polymerization of the mixture (AM) in one or more stages, at least the first stage of the polymerization of the mixture (AM) being carried out to a conversion of more than 15% by weight, by thermal or free radical mass or solution polymerization.

The present invention furthermore relates to molding materials prepared by the novel process and to moldings or shaped articles produced from said molding materials.

Although the novel process is described as a 3-stage process for the sake of clarity, the process is however also used when only the 3rd stage is carried out, ie. the special acrylic rubber (A2) dissolved or swollen in monomers (A1m) is polymerized as stated.

Monomers (A2m1) suitable for the preparation of the acrylic rubber (A2) are esters of acrylic acid and/or methacrylic acid of the formula $CH_2=CR^1-COOR^2$, where $R^1$ is hydrogen or methyl and $R^2$ is alkyl of 1 to 32, in particular 1 to 12, carbon atoms. Acrylates of an alkyl alcohol of 4 to 12 carbon atoms which is linear or at most singly branched are very suitable. Esters of n-butanol and 2-ethylhexyl alcohol are preferred. For a given content of certain macromonomers, the glass transition temperature $T_g$ of the resulting acrylic rubber (A2) can be established by the choice of acrylates, methacrylates or mixtures thereof, and the glass transition temperature $T_g$ should be below 0° C., in particular below −10° C., preferably below −20° C. This establishment of the glass transition temperature is based on the fact that the glass transition temperature of alkyl acrylate and methacrylate polymers decreases with increasing length of the side chains and passes through a minimum at $C_7$-alkyl acrylate and $C_{10}$-alkyl methacrylate and then increases again. In general, the content of alkyl acrylate and methacrylate (A2m1) in the mixture (A2M) is from about 50 to 99.9, preferably from 80 to more than 90, % by weight, based on the total amount of monomers (including macromonomers) in the mixture (A2M).

The mixture (A2M) furthermore contains at least one macromonomer (A2m2) having a terminal copolymerizable C=C double bond, preferably an acrylate and/or a methacrylate group of the formula

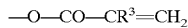

where $R^3$ is hydrogen or methyl.

The macromonomer can be incorporated as polymerized units into the resulting acrylate copolymer via this double bond. Suitable macromonomers, which are also commercially available, have an average molecular weight $M_w$ of from 1500 to 40000, preferably from 2000 to 20000 g/mol. Since the macromonomers are generally prepared by anionic polymerization and in particular with lithium hydrocarbons as initiators, initiator concentration substantially determines the resulting molecular weight of the macromonomers, which have a very narrow molecular weight distribution ($M_w/M_n$ generally <1.1). The molecular weight can be determined, for example, by vapor phase osmosis. The preparation of the macromonomers is described in the literature. Macromonomers which are wholly or partly compatible with the copolymers or polymers to be prepared from the monomers (A1m) and at least in part contain units of the monomers (A1m) as polymerized units in the macromonomer chain are preferred. For example, macromonomers whose chains are formed at least partially from units of such monomers (A1m) are also particularly suitable for the preparation of ASA molding materials in which predominantly styrene, α-methylstyrene and acrylonitrile are as monomers (A1m). The amount of macromonomers (A2m2) in mixture (A2M) is in general from about 1 to 50, in particular from 2 to 25, % by weight based on the total amount of monomers (including macromonomers) in the mixture (A2M).

Further copolymerizable olefinically unsaturated monomers (A2m3) may be concomitantly used for the preparation of the acrylic rubber (A2), in an amount of, in general, less than 50% by weight of the amount of alkyl acrylate and/or alkyl methacrylate (A2m1) in the mixture (A2M).

Such further comonomers (A2m3) are in particular monomers having at least two olefinically unsaturated double bonds, such as allyl methacrylate or acrylate, 1,4-butanediol dimethacrylate or diacrylate, divinylbenzene, triallyl cyanurate and dihydrodicyclopentadienyl acrylate or methacrylate. Monomers having nonconjugated double bonds are preferred, in particular allyl methacrylate and dihydrodicyclopentadienyl acrylate and methacrylate. The mixture (A2M) contains 0 to 20, in particular from 0.3 to 15, particularly preferably from 0.3 to 12, % by weight, based on the total amount of monomers (including macromonomers) in the mixture (A2M), of these monomers which effect crosslinking or support the grafting of the monomers (A1m). The content of these monomers in the mixture (A2M) depends to a great extent on the reactivity of the two C=C double bonds of the monomers. If both are very reactive and are both incorporated into the polymer chain during the polymerization of the mixture (A2M), increasing crosslinking of the acrylic rubber copolymer (A2) takes place at higher concentrations of monomers having at least 2 C=C double bonds. If, on the other hand, only one C=C double bond is readily polymerizable, as with the use of dihydrodicyclopentadienyl acrylate or methacrylate, the monomer can be used in a larger amount and effects increased grafting of the monomers (A1m) onto the acrylic rubber (A2) in the polymerization in the third stage of the process.

Examples of further comonomers (A2m3) for the preparation of the acrylic rubber (A2), which may be present in particular in amounts of from 1 to 20% by weight, based on the total amount of monomers (including macromonomers) in the mixture (A2M), are styrene, acrylonitrile, acrylic acid, methacrylic acid, maleic anhydride, maleimide, glycidyl methacrylate, acrylamide, methacrylamide and derivatives of these amides, such as N-methylolmethacrylamide and N-methylolacrylamide, and ethers and esters of these N-methylol compounds, such as their methyl or n-butyl ethers or their acetates. Comonomers which effect linking of acrylic rubber (A2) (grafting base) and graft shell comprising the monomers (A1m) by chemical crosslinking reactions are advantageous. Furthermore, the grafting yield from the polymerization of the mixture (AM) can be increased, and hence bonding between acrylic rubber (A2) and the graft shell comprising the monomers (A1m) can be promoted, by the presence of comonomers having peroxide or diazo groups in the preparation of the acrylic rubber (A2), for example of tert-butyl 3-isopropenylcumyl peroxide or tert-butyl peroxycrotonate, which form free radicals and hence grafts in the polymerization of the mixture (AM) by thermal decomposition.

The copolymerization of the monomers (A2m1) with (A2m2) and, if required, (A2m3) can be carried out in a known manner and is preferably initiated with free radical initiators and in particular effected by solution polymerization or emulsion polymerization.

After the polymerization is complete and if necessary residual monomers have been removed or the acrylic rubber (A2) isolated, the latter is, according to the invention, dissolved or at least thoroughly swollen in the monomers (A1m) subsequently forming the hard graft shell, with or without the addition of required amounts of a suitable inert solvent and with stirring and/or heating of the mixture. If the addition of solvent is required for this purpose, the amount thereof is in particular not more than 50% by weight of the amount of monomers (A1m) and acrylic rubber (A2).

Examples of suitable monomers (A1m) which subsequently also form the graft shell (A1) are styrene, α-methylstyrene, styrene alkylated in the nucleus, acrylonitrile, methacrylonitrile, alkyl acrylates and alkyl methacrylates, such as methyl methacrylate. Monomers and monomer mixtures which give a polymer having a glass transition temperature of more than +20° C., preferably more than +50° C., are preferred. A mixture of more than 50, in particular from 60 to 80, % by weight of styrene and less than 50, in particular from 20 to 40% by weight of acrylonitrile is particularly preferably used as monomers (A1m).

The amount of monomers (A1m) in the mixture (AM) depends in particular on the desired content of acrylic rubber (A2) in the resulting molding material (A). In general, the amount by weight of the monomers (A1m) in the mixture (AM) is from 2/3 to about 100, in particular from 3 to 20, times the amount of acrylic rubber (A2) present.

The polymerization of the monomers (A1m) in the presence of the acrylic rubber (A2) dissolved or swollen in the monomers (A1m) (mixture AM) is carried out in one or more stages, it also being possible to change the proportions of the different monomers (A1m) in the stages. The graft polymerization is preferably carried out by thermal or free radical polymerization at from room temperature to 200° C., in particular from 50 to 160° C. The one-stage or multi-stage polymerization must be carried out, at least in its initial phase under a conversion of more than 15, preferably more than 20 to 40% by weight of the monomers, by mass or solution polymerization. After this initial phase, polymerization can then be continued and ended by another known polymerization method, advantageously by suspension polymerization in the presence of known initiators and stabilizers for the suspension polymerization.

The molding material (A) obtained after the polymerization of the mixture (AM), which constitutes and includes a graft polymerization of monomers (A1m) onto the acrylic rubber (A2), contains in general from 1 to 60, in particular from 5 to 40, % by weight of the acrylic rubber (A2). The upper limit of the content of acrylic rubber (A2) is determined by the fact that the molding material (A) must have sufficient strength in spite of the embedded domains of the rubber. The lower limit is essentially determined by the condition that sufficient energy is absorbed by the molding material on deformation. In the molding material (A), the acrylic rubbers occur in grafted form and particles having a diameter of from 0.1 to 20, preferably from 0.1 to 10 $\mu$m.

The molding materials (A) prepared according to the invention have improved impact strength, notched impact strength and hole impact strength and good flow behavior. Shaped articles produced therefrom additionally have the advantage that their surface gloss is greatly reduced and the surfaces are often dull.

The following examples of preferred embodiments and a comparative experiment illustrate the invention.

Percentages are by weight unless stated otherwise.

The polyvinylpyrrolidone used was obtained from BASF AG and had a K value of 90 (according to Fikentscher, Cellulosechemie 13 (1932)58).

The polyvinyl alcohol used (Moviol® 30–92 from Hoechst AG) had a degree of hydrolysis of 92 mol % and its 4% strength aqueous solution had a viscosity of 30 mPa.s at 20° C. (DIN 53015).

The values for the impact strength in $kJ/m^2$ were determined according to DIN 53 453-K, 5/75 edition.

The values for the notched impact strength in $kJ/m^2$ were determined according to DIN 53 4534-K, 5/75 edition.

The values for the hole impact strength in $kJ/m^2$ were determined according to DIN 53 753-L-30, 4/81 edition.

The flow behavior and hence the processability were assessed on the basis of the melt flow rate in g/10 min, which was measured according to ISO 1133 at 200° C. and under a load of 21.6 kg.

The glass transition temperature was determined by means of the DSC method (K. H. Illers, Makromolekulare Chemie 127 (1969),1) and according to ASTM 3416.

The average molecular weight of the commercial macromonomers used was stated by the producer.

EXAMPLE 1

(a) Preparation of the Acrylic Rubber (A2)

924 g of toluene were introduced into a flask and heated to 75° C. under nitrogen, and 5% of feed 1 and feed 2 stated below were then initially taken.

|  | Feed 1 |  | Feed 2 |
| --- | --- | --- | --- |
| 225 g | of n-butyl acrylate (A2m1) | 30 ml | of acetone |
| 25 g | of SAN macromonomer AN-6 (A2m2) | 54 ml | of toluene |
| 6 g | of allyl methacrylate (A2m2) | 273 g | of azobisisobutyronitrile (AIBN) |

SAN-Macromonomer AN-6 was obtained from Toman. It has a chain of a copolymer of 75% of styrene and 25% of acrylonitrile with a terminal methacrylate group and, according to the company, has a molecular weight $M_w$ of 6000.

The remainder of feeds 1 and 2 was metered in over 4 hours. Polymerization was then continued to a conversion of 93%, an additional 145 mg of AIBN being metered in after a polymerization time of from 9 to 15 hours. At the end of the polymerization reaction, the mixture was cooled and was stabilized with 0.12% (based on the amount of n-butyl acrylate) of octadecyl (3,5-di-tert-butyl-4-hydroxyphenyl) propionate as an antioxidant. The acrylic rubber (A2) has a glass transition temperature of less than –25° C.

b)+c)

Preparation of the Molding Material(A) with the Acrylic Rubber (A2)

The toluene, acetone and residual monomer from stage (a) were removed under reduced pressure in a rotary evaporator and replaced by certain amounts of styrene, after which acrylonitrile was added in an amount such that a mixture (AM) of 69.2% of styrene (A1m1), 23% of acrylonitrile (A1m2) and 7.8% of acrylic rubber (A2) resulted. The acrylic rubber (A2) was present in solution in the mixture (AM). 1923 g of this solution, together with 1.93 g of a 75% strength solution of benzoyl peroxide, 1.92 g of tert-dodecyl mercaptan and 2.31 g of octadecyl 3-(3,5-di-tert-butyl-4-hydroxyphenyl)propionate as an antioxidant, were then introduced into a 5 liter steel kettle and heated to 86° C. At a conversion of 40% of the monomers, 1.7 g of dicumyl peroxide, 2000 g of water, 20 g of polyvinylpyrrolidone, 2.0 g of tetrasodium diphosphate and 60 g of a 10% strength aqueous solution of polyvinyl alcohol were added. The polymerization batch was polymerized for 3 hours at 110° C., for 3 hours at 130°C. and for 6 hours at 140°C. Thereafter, the batch was cooled and the polymer was filtered off and dried. Certain properties of the resulting molding material (A) are stated in Table 1 for comparison.

EXAMPLE 2

The procedure was as in Example 1, except that, in the preparation of the acrylic rubber (A2), the total amount of the macromonomer was initially taken at the beginning of the acrylic rubber copolymerization instead of the macromonomer being gradually metered in with feed 1. Certain properties of the resulting molding material (A) are stated in Table 1.

EXAMPLE 3

The procedure was as in Example 1, except that the proportion of the macromonomer in feed 1 was reduced in the preparation of the acrylic rubber (A2).

| Feed 1 |
| --- |
| 231.25 g of n-butyl acrylate (A2m1) |
| 18.75 g of SAN macromonomer AN-6 (A2m2) |
| 6.00 g of allyl methacrylate (A2m3) |

Certain properties of the resulting molding material (A) are stated in Table 1.

Comparative Experiment

The procedure was as in Example 1, except that the SAN macromonomer was omitted from feed 1 and was replaced by a corresponding amount of n-butyl acrylate (A2m1).

| Feed 1 |
| --- |
| 250 g of n-butyl acrylate (A2m1) |
| 6 g of allyl methacrylate (A2m3) |

Certain properties of the resulting molding material are stated in Table 1.

TABLE 1

| Example | 1 | 2 | 3 | Comparative experiment |
|---|---|---|---|---|
| % of macromonomer in acrylic rubber | 10 | 10 | 7.5 | 0 |
| Impact strength (kJ/m$^2$) | 39 | 48 | 35 | 16 |
| Notched impact strength (kJ/m$^2$) | 2.2 | 3.1 | 2.5 | 1.7 |
| Hole impact strength (kJ/m$^2$) | 9 | 9.2 | 8.6 | 5 |
| Melt flow rate (g/10 min) | 7 | 18 | 12 | 7 |

We claim:

1. A process for the preparation of a molding composition (A) by
   (a) copolymerization of a mixture (A2M) of
      (a1) 50 to 99% by weight of at least one monomer (A2m1) of the formula $$CH_2=CR^1-COOR^2$$

where $R^1$ is hydrogen or methyl and $R^2$ is alkyl of 1 to 32 carbon atoms,
      (a2) 1 to 50% by weight of at least one macromonomer (A2m2) which has a terminal copolymerizable C=C double bond and an average molecular weight $M_w$ of from about 1500 to 40000, contains units of at least one of the monomers (A1m) as polymerized units and is wholly or partly compatible with the polymers or copolymers of the monomers (A1m), and
      (a3) if required, optionally at least one further copolymerizable olefinically unsaturated monomer (A2m3) in an amount of less than 50% by weight of the amount of alkyl acrylate or methacrylate (A2m1), to give an acrylic rubber (A2) having a glass transition temperature of less than 0° C.,
   (b) dissolution or swelling of the acrylic rubber (A2), with or without the addition of a solvent, in one or more olefinically unsaturated monomers (A1m), which form the hard graft shell and whose polymers or copolymers have a glass transition temperature of at least +20° C. to give a mixture (AM) and
   (c) graft polymerization of the mixture (AM) in one or more stages, at least the first stage of the polymerization of the mixture (AM) being carried out to conversion of more than 15% by weight, by thermal or free radical mass or solution polymerization.

2. A process as defined in claim 1, wherein the amount of the macromonomer (A2m2) is from 1 to 25% by weight of the total amount of the monomers (A2m) (including macromonomers) of the mixture (A2M).

3. A process as defined in claim 1, wherein the macromonomer (A2m2) contains a terminal group of the formula $$-O-CO-CR^3=CH_2$$

where $R^3$ is hydrogen or methyl.

4. A process as defined in claim 1, wherein a mixture of more than 50% by weight of styrene and less than 50% by weight of acrylonitrile is used as monomers (A1m), the percentages being based on the total amount of the monomers of the mixture (AM).

5. A process as defined in claim 1, wherein the macromonomer (A2m2) predominantly comprises styrene and acrylonitrile units.

6. A process as defined in claim 1, wherein the acrylate copolymer (A2) is prepared from a mixture (A2M) which contains, as further monomer (A2m3) a monomer having two nonconjugated olefinically unsaturated double bonds, in an amount of from 0.5 to 15% by weight of the mixture (A2M).

7. A process as defined in claim 1, wherein the polymerization of the mixture (AM) is started as a thermal or free radical mass or solution polymerization and, after a conversion of more than 20% by weight of monomers, is continued as a free radical suspension polymerization.

8. A molding composition which is derived from one of the processes of claim 1.

9. A molding composition (A) modified with acrylic rubber and derived from a one-stage or multi-stage graft polymerization of a mixture (AM) of
   (i) one or more olefinically unsaturated monomers (A1m) which form the hard graft shell (A1) and whose polymers or copolymers have a glass transition temperature of at least +20° C. and
   (ii) an acrylic rubber (A2) which has a glass transition temperature of less than 0° C. and is a copolymer (A2) prepared from
      (a1) 50 to 90% by weight of at least one monomer (A2m1) of the formula $$CH_2=CR^1-COOR^2$$

where $R^1$ is hydrogen or methyl and $R^2$ is alkyl of 1 to 32 carbon atoms,
      (a2) 1 to 50% by weight of at least one macromonomer (A2m2) which has a terminal copolymerizable C=C double bond and an average molecular weight $M_w$ of from about 1500 to 40000, contains units of at least one of the monomers (A1m) as polymerized units and is wholly or partly compatible with the polymers or copolymers of the monomers (A1m) and
      (a3) if required, optionally at least one further olefinically unsaturated monomer in an amount of less than 50% by weight of the amount of monomer (A2m1), at least the first stage of the graft polymerization of the mixture (AM), after dissolution or swelling of the acrylic rubber (A2) in the monomers (A1m), being carried out, to a conversion of more than 15% by weight of the monomers, by thermal or free radical mass or solution polymerization and wherein the molding mass (A) contains 1 to 60% by weight of the acrylic rubber (A2).

10. A shaped article having improved impact strength and improved surface gloss, which is derived from a molding material as defined in claim 8 or 9.

11. A shaped article having improved impact strength and improved surface gloss, which is obtainable from a molding material as defined in claim 9.

* * * * *